(12) United States Patent
Kadowaki et al.

(10) Patent No.: US 12,344,702 B2
(45) Date of Patent: Jul. 1, 2025

(54) POLYURETHANE FOR POLISHING LAYER, POLISHING LAYER, AND POLISHING PAD

(71) Applicant: KURARAY CO., LTD., Kurashiki (JP)

(72) Inventors: Kiyofumi Kadowaki, Kurashiki (JP); Mitsuru Kato, Kurashiki (JP); Minori Takegoshi, Kurashiki (JP); Chihiro Okamoto, Kurashiki (JP); Shinya Kato, Chiyoda-ku (JP)

(73) Assignee: KURARAY CO., LTD., Kurashiki (JP)

( * ) Notice: Subject to any disclaimer, the term of this patent is extended or adjusted under 35 U.S.C. 154(b) by 1013 days.

(21) Appl. No.: 17/262,060

(22) PCT Filed: Jul. 19, 2019

(86) PCT No.: PCT/JP2019/028384
§ 371 (c)(1),
(2) Date: Jan. 21, 2021

(87) PCT Pub. No.: WO2020/036038
PCT Pub. Date: Feb. 20, 2020

(65) Prior Publication Data
US 2021/0309794 A1 Oct. 7, 2021

(30) Foreign Application Priority Data
Aug. 11, 2018 (JP) ................. 2018-152144

(51) Int. Cl.
*C08G 18/76* (2006.01)
*B24B 37/22* (2012.01)
*B24B 37/24* (2012.01)
*C08G 18/32* (2006.01)

(52) U.S. Cl.
CPC .......... *C08G 18/7657* (2013.01); *B24B 37/22* (2013.01); *B24B 37/24* (2013.01); *C08G 18/3206* (2013.01)

(58) Field of Classification Search
CPC ....................... C08G 18/7657; C08G 18/3206; B24B 37/22; B24B 37/24
See application file for complete search history.

(56) References Cited

U.S. PATENT DOCUMENTS

| | | |
|---|---|---|
| 2009/0298392 A1 | 12/2009 | Okamoto et al. |
| 2012/0083187 A1 | 4/2012 | Okamoto et al. |
| 2013/0273813 A1 | 10/2013 | Prasad |
| 2017/0291275 A1 | 10/2017 | Kadowaki et al. |
| 2017/0334034 A1 | 11/2017 | Kadowaki et al. |
| 2019/0232460 A1* | 8/2019 | Takegoshi .............. B24B 37/20 |
| 2020/0190247 A1 | 6/2020 | Oshita et al. |

FOREIGN PATENT DOCUMENTS

| | | | |
|---|---|---|---|
| EP | 2 247 639 A0 | 11/2010 | |
| JP | 2007-91898 A | 4/2007 | |
| JP | WO2010/146982 A1 | 12/2010 | |
| JP | 2014-38916 A | 2/2014 | |
| JP | 2015-512799 A | 4/2015 | |
| JP | WO2016/067588 A1 | 5/2016 | |
| JP | WO2016/084321 A1 | 6/2016 | |
| JP | WO 2018/021428 * | 2/2018 | ........... B24B 37/044 |
| JP | WO2018/021428 A1 | 2/2018 | |
| JP | WO2018/207670 A1 | 11/2018 | |
| WO | WO 2007/034980 A1 | 3/2007 | |
| WO | WO 2017/054433 A1 | 4/2017 | |

OTHER PUBLICATIONS

Extended European Search Report issued Mar. 31, 2022 in European Patent Application No. 19849245.6, 12 pages.
International Search Report issued on Sep. 17, 2019 in PCT/JP2019/028384 filed on Jul. 19, 2019, 2 pages.

* cited by examiner

*Primary Examiner* — Pegah Parvini
(74) *Attorney, Agent, or Firm* — Oblon, McClelland, Maier & Neustadt, L.L.P.

(57) ABSTRACT

There is used a polyurethane for polishing layers that can be used as a material of a polishing layer of a polishing pad, the polyurethane including a thermoplastic polyurethane that is a reaction product of a polyurethane raw material including a polymer diol, an organic diisocyanate, and a chain extender, wherein the chain extender contains 50 mass % or more of a first chain extender including a straight-chain carbon backbone having 7 to 12 carbon atoms.

19 Claims, 5 Drawing Sheets

POLYURETHANE FOR POLISHING LAYER, POLISHING LAYER, AND POLISHING PAD

TECHNICAL FIELD

The present invention relates to a polyurethane that can be used as a material of a polishing layer of a polishing pad used for polishing a silicon wafer, a semiconductor device, a hard disk, a glass substrate, an optical product, or various metals.

BACKGROUND ART

Chemical mechanical polishing (CMP) is known as a polishing method used for mirror finishing a silicon wafer and planarizing the surface of an insulating film and a conductive film of a semiconductor device. CMP is a method of polishing a material to be polished by pressing the material against a polishing pad, while adding dropwise a polishing slurry (hereinafter also simply referred to as "slurry) containing abrasive grains and a reaction liquid to the surface of a polishing pad. In CMP, the mechanical properties and the surface shape of the polishing layer are known to significantly affect polishing results.

Semiconductor devices include minute circuits with a high level of integration and multilayered interconnections, and therefore an accurate planarity is required for a polished surface of a material to be polished. Accordingly, accurate planarization performance is also required for a polishing pad used for the planarization process for the material to be polished.

In the recent semiconductor manufacturing process, the diameter of silicon wafers is expected to become increasingly large in order to achieve cost reduction. As the increase in the diameter of silicon wafers progresses, more accurate polishing uniformity and planarization performance than those in the past are also required for the polishing pad. Therefore, there is a need for a material of a polishing layer for realizing such a polishing pad.

Thermoplastic polyurethanes are known as the materials of polishing layers. A thermoplastic polyurethane is produced by reacting a polyurethane raw material including a polymer diol, an organic diisocyanate, and a chain extender. Various such thermoplastic polyurethanes are conventionally known.

For example, PTL 1 listed below discloses a thermoplastic polyurethane produced using a chain extender including a chain extender having a straight chain of an even number of carbon atoms and a chain extender having a straight chain of an odd number of carbon atoms at a predetermined ratio, as a polyurethane that can be suitably used for a molded body for polishing layers and that has well-balanced rigidity and toughness (mechanical properties), and good processability. Also, PTL 1 discloses a thermoplastic polyurethane produced using 1,18-octadecanediol, which is a chain extender including a straight-chain carbon backbone having 18 carbon atoms.

In addition, for example, PTL 2 listed below discloses, as a polishing pad used in a system for detecting the end point of polishing, a polishing pad formed of a material containing a polyurethane and at least one light-absorbing compound. Also, PTL 2 describes, as an example of the chain extender, 1,12-dodecandiol, which is a chain extender including a straight-chain carbon backbone having 12 carbon atoms.

In addition, for example, PTL 3 listed below discloses a molded body for polishing layers that includes a thermoplastic polyurethane for producing a molded body for polishing layers that has both high moldability and high planarization performance. Also, PTL 3 discloses, as a chain extender used for production of the thermoplastic polyurethane, 1,8-octanediol and 2-methyl-1,8-octanediol, each of which includes a straight-chain carbon backbone having 8 carbon atoms, 1,9-nonanediol, which includes a straight-chain carbon backbone having 9 carbon atoms, and 1,10-decanediol, which includes a straight-chain carbon backbone having 10 carbon atoms.

In addition, for example, PTL 4 listed below discloses a non-porous molded body of a thermoplastic polyurethane used for a polishing layer, wherein burrs are less likely to be generated at corner portions of recesses formed in a polishing surface even after CMP polishing performed for a long period of time. Also, PTL 4 discloses 1,9-nonanediol as the chain extender used for the thermoplastic polyurethane.

In addition, for example, PTL 5 listed below discloses a molded body of a thermoplastic polyurethane used for a polishing pad that can achieve an improved planarity and an improved planarization efficiency for the polished surface while producing little scratching. Also, PTL 5 discloses 1,9-nonanediol as the chain extender used for production of the thermoplastic polyurethane.

In addition, for example, PTL 6 listed below discloses a thermoplastic polyurethane molded body used for production of a metal-film-polishing pad that can achieve a high polishing rate and exhibits a polishing performance with good polishing uniformity. Also, PTL 6 discloses 1,9-nonanediol as the chain extender thermoplastic polyurethane.

CITATION LIST

Patent Literatures

[PTL 1] WO 2010/146982
[PTL 2] Japanese Laid-Open Patent Publication No. 2015-512799
[PTL 3] WO 2016/084321
[PTL 4] WO 2016/067588
[PTL 5] WO 2007/034980
[PTL 6] Japanese Laid-Open Patent Publication No. 2014-038916

SUMMARY OF INVENTION

Technical Problem

In polishing, the surface of a polishing layer is subjected to dressing in which the surface is roughened using a dresser such a diamond dresser. In a polishing pad including a polishing layer using the conventional thermoplastic polyurethane molded body, the roughness of the pad surface after dressing may not be sufficiently increased. As a result, in polishing using such a polishing pad, the polishing rate may be reduced, or the polishing uniformity may be reduced. In particular, such a problem is likely to occur when a polyurethane molded body in a non-foamed structure that has a low surface hardness is used as the polishing layer.

It is an object of the present invention to provide a polishing layer exhibiting good dressing performance as a polishing layer of a polishing pad.

Solution to Problem

An aspect of the present invention is directed to a polyurethane for polishing layers, including a thermoplastic polyurethane that is a reaction product of a polyurethane raw material including a polymer diol, an organic diisocyanate, and a chain extender, wherein the chain extender contains 50 mass % or more of a first chain extender including a straight-chain carbon backbone having 7 to 12 carbon atoms. A polishing layer using such a polyurethane molded body exhibits good dressing performance even when the surface hardness is low.

It is preferable that the chain extender included in the polyurethane raw material contains 80 mass % or more of the first chain extender, because a polishing layer can be obtained that can maintain a hardness high enough to prevent the occurrence of scratches.

It is preferable that the chain extender included in polyurethane raw material includes only a non-cyclic compound. In such a case, high crystallinity is exhibited as a result of the urethane groups being aggregated in the hard segment of the polyurethane. Thus, a reduction in the elastic modulus and a reduction in the hardness due to absorbing water or heat generated during polishing are less likely to occur, so that a polishing layer exhibiting high planarization performance and polishing stability can be easily obtained. This is preferable because a polishing layer that can achieve both high dressing performance and high planarization performance can be easily obtained.

Examples of the first chain extender include 1,7-heptanediol, 1,8-octanediol, 1,9-nonanediol, 2-methyl-1,8-octanediol, 1,10-decanediol, and 1,12-dodecandiol.

It is preferable that the polyurethane has at least one endothermic peak in a range of 100 to 160° C. in a DSC curve as measured by differential scanning calorimetry. This is preferable because, in such a case, the polishing layer is less likely to be softened by the heat generated during polishing, so that a polishing layer that is well-balanced in the dressing performance and the temperature dependence of the mechanical properties can be obtained. In particular, it is preferable that the polyurethane has at least two endothermic peaks in a range of 100 to 160° C. In such a case, the polishing layer is particularly less likely to be softened by the heat generated during polishing, and therefore the below-described ratio ($E'_{21}/E'_{80}$) between a storage modulus $E'_{21}$ at 21° C. and a storage modulus $E'_{80}$ at 80° C. is likely to be 10 or less. This is preferable because, in this case, a polishing layer that is particularly well-balanced in the dressing performance and the temperature dependence of the mechanical properties can be obtained.

It is preferable that the endothermic peak or peaks have a total amount of a crystallization enthalpy ($\Delta H$) of 10 J/g or more. This is preferable because, in such a case, a hardness high enough to prevent the occurrence of scratches is maintained even when heat is generated during polishing, so that a polishing layer having a high polishing rate and high polishing stability, and exhibiting good planarization performance can be obtained.

It is preferable that the polymer diol has a number-average molecular weight of 600 to 1400, and contains 4.0 to 6.0 mass % of nitrogen derived from the organic diisocyanate, because a polishing layer that can maintain a high hardness and exhibits good polishing uniformity can be obtained.

It is preferable that the polyurethane, in a form of a sheet having a thickness of 0.5 mm, has a laser transmittance for a laser wavelength of 660 nm, of 70% or more, because a polishing layer can be obtained that allows the end point of polishing to be inspected by optical means while polishing the surface to be polished.

It is preferable that the polyurethane, in a form of a sheet having a thickness of 0.3 mm, has a storage modulus retention when swollen to saturation with water, of 55% or more, as calculated by the following formula (1): A/B×100 (1) (A represents a storage modulus at 21° C. after swollen to saturation with warm water at 50° C., and B represents a storage modulus at 21° C. when not swollen with water). This is preferable because, in such a case, a polishing layer whose polishing characteristics are less likely to change over time even when swollen with water during polishing can be obtained.

It is preferable that the polyurethane, in a form of a sheet having a thickness of 0.3 mm, has a ratio ($E'_{21}/E'_{80}$) between a storage modulus $E'_{21}$ at 21° C. and a storage modulus $E'_{80}$ at 80° C., of 10 or less, because a polishing layer that can maintain a high hardness and exhibits high polishing uniformity can be obtained.

It is preferable that the polyurethane, in a form of a sheet having a thickness of 2 mm, has a JIS-D hardness of 50 to 70, because a polishing layer exhibiting particularly good polishing uniformity can be obtained.

An aspect of the present invention is directed to a polishing layer including a molded body of any one of the above-described polyurethanes for polishing layers. Such a polishing layer can be suitably used as a polishing layer exhibiting good dressing performance. It is preferable that the polishing layer includes a non-foamed molded body, because a higher hardness can be maintained, high polishing uniformity can be achieved, and there is no variation due to foaming distribution.

An aspect of the present invention is directed to a polishing pad including the above-described polishing layer.

Advantageous Effects of Invention

According to the present invention, it is possible to obtain a polishing layer of a polishing pad that exhibits good dressing performance.

DESCRIPTION OF EMBODIMENT

Figure 1:
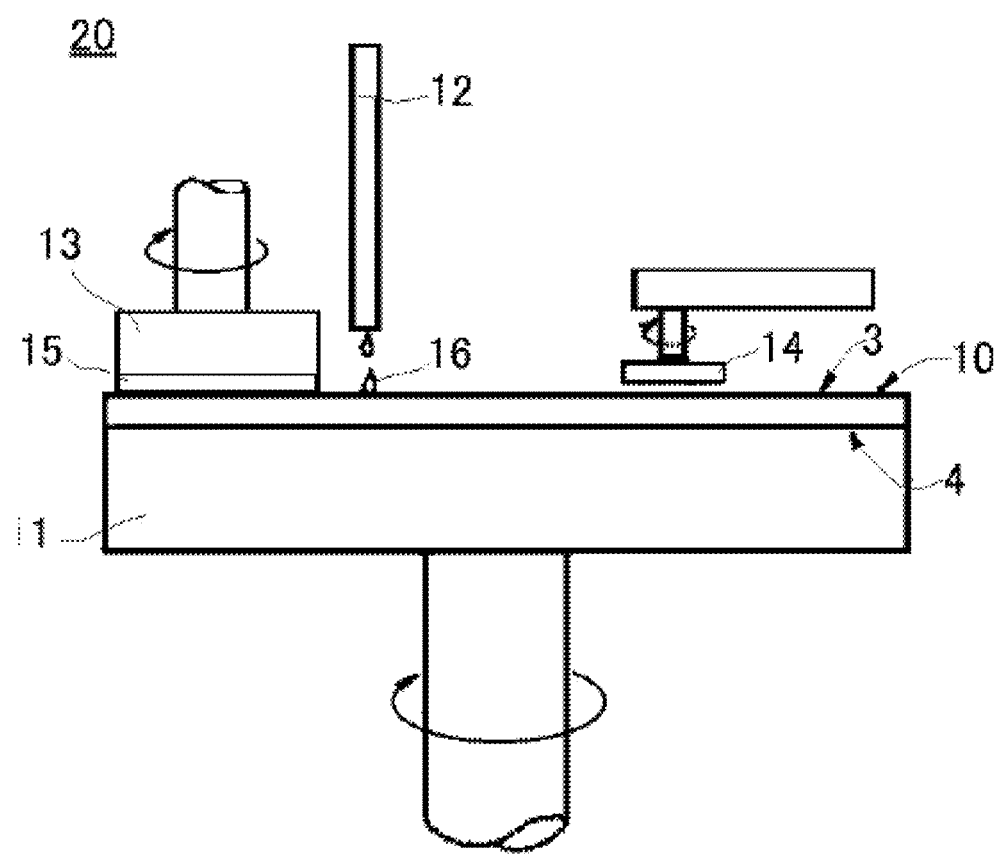
FIG. 1 is an explanatory diagram illustrating CMP using a polishing pad according to the present embodiment.

Hereinafter, a polyurethane for polishing layers, a polishing layer, and a polishing pad according to an embodiment of the present invention will be described in detail.

The polyurethane for polishing layer according to the present embodiment is a polyurethane including a thermoplastic polyurethane that is a reaction product of a polyurethane raw material including a polymer diol, an organic diisocyanate, and a chain extender, wherein the chain extender contains 50 mass % or more of a first chain extender including a straight-chain carbon backbone having 7 to 12 carbon atoms.

The polyurethane can be produced by polymerization of a polyurethane raw material that includes a polymer diol, an organic diisocyanate, and a chain extender containing 50 mass % or more of a first chain extender including a straight-chain carbon backbone having 7 to 12 carbon atoms. The polymerization is a urethanation reaction using a known prepolymer method or a one-shot method. Specifically, examples thereof include a method in which the polyurethane raw material is subjected to continuous melt-polymerization substantially in the absence of a solvent, while being melt-mixed at a predetermined ratio using a single-screw or multi-screw extruder, and a method in which the polyurethane raw material is subjected to solution polymerization in the presence of a solvent.

The chain extender is a low-molecular weight compound that has been conventionally used as a raw material for producing a polyurethane, the low-molecular weight compound including, in the molecule, two active hydrogen atoms capable of reacting with an isocyanate group, and having a number-average molecular weight of less than 400, preferably a number-average molecular weight of 300 or less.

The chain extender used for production of the polyurethane of the present embodiment contains 50 mass % or more of a first chain extender including a straight-chain carbon backbone having 7 to 12 carbon atoms. Note that the number of carbons of the straight-chain carbon backbone of the chain extender means the number of carbon atoms of the straight-chain carbon backbone between the two active hydrogen atoms capable of reacting with an isocyanate group.

The number of carbon atoms of the straight-chain carbon backbone of the first chain extender is 7 to 12, and preferably 8 to 10. The first chain extender including a straight-chain carbon backbone having 7 to 12 carbon atoms makes the intervals between the urethane groups in the hard segment of the polyurethane molecule moderately long, thus reducing the aggregation density between the molecular chains of the polyurethane. This results in a reduction in the crystallinity of the polyurethane, and a reduction in the abrasion resistance of the polyurethane. Note that the chain extender including a straight-chain carbon backbone having 13 or more carbon atoms has a low reactivity with the organic diisocyanate, and therefore the molecular weight of the polyurethane is less likely to increase.

Specific examples of the first chain extender include a chain extender including a straight-chain carbon backbone having 7 carbon atoms, such as 1,7-heptanediol; a chain extender including a straight-chain carbon backbone having 8 carbon atoms, such as 1,8-octanediol and 2-methyl-1,8-octanediol; a chain extender including a straight-chain carbon backbone having 9 carbon atoms, such as 1,9-nonanediol; a chain extender including a straight-chain carbon backbone having 10 carbon atoms, such as 1,10-decanediol; and a chain extender including a straight-chain carbon backbone having 12 carbon atoms, such as 1,12-dodecandiol. As the first chain extender, a single compound may be used alone, or two or more compounds may be used in combination. In order to prevent the polishing layer from becoming too soft during polishing due to an increase in the temperature dependence, thus preventing the reduction in the polishing uniformity and the polishing efficiency, it is preferable that substantially a single compound is used alone.

The content ratio of the first chain extender to the total amount of the chain extender is 50 mass % or more, preferably 70 mass % or more, more preferably 80 mass % or more, and particularly preferably 90 to 100 mass %. In a polyurethane produced using a chain extender containing 50 mass % or more of the first chain extender, the interval between the urethane groups in the hard segment of the polyurethane molecule is moderately increased, whereby the aggregation density between the molecular chains is moderately reduced, to moderately reduce the crystallinity of the polyurethane. Such a polyurethane has a moderately low abrasion resistance. As a result, a polishing layer using such a polyurethane can be easily dressed, and the surface roughness thereof is increased when the surface is subjected to a dressing treatment, thus exhibiting favorable slurry retention. Then, a polishing layer exhibiting good polishing uniformity and a good polishing rate can be obtained.

When the content ratio of the first chain extender to the total amount of the chain extender is less than 50 mass %, the interval between the urethane groups in the hard segment of the polyurethane molecule is not sufficiently increased. Accordingly, the aggregation density between the molecular chains is increased, so that a polyurethane with high crystallinity can be obtained. A polyurethane with high crystallinity has high abrasion resistance. A polishing layer using such a polyurethane is less likely to be dressed, and the surface roughness thereof is reduced and the fuzzing on the surface is also reduced when the surface is subjected to a dressing treatment, thus exhibiting low slurry retention.

Specific examples of the chain extender that is other than the first chain extender and that can be used in combination with the first chain extender include a compound including a carbon backbone having 3 carbon atoms, such as 2,2-dimethylpropane-1,3-diol; a compound including a carbon backbone having 4 carbon atoms, such as 1,4-butane diol and cyclohexanediol; a compound including a carbon backbone having 5 carbon atoms, such as 1,5-pentanediol and 3-methyl-1,5-pentanediol; a compound including a carbon backbone having 6 carbon atoms, such as 1,6-hexanediol and cyclohexane dimethanol; a compound including a carbon backbone having 16 carbon atoms, such as 1,16-hexadecane diol; and a compound including a carbon backbone having 18 carbon atoms, such as 1,18-octadecanediol. These may be used alone, or in a combination of two or more.

When the chain extender includes the first chain extender and any other chain extenders, the average number of carbon atoms of the straight-chain carbon backbones of the chain extenders is preferably 7 to 12, and more preferably 8 to 10. Note that the average number of carbon atoms of the straight-chain carbon backbones can be calculated from the sum of products multiplying the carbon atoms of the straight-chain carbon backbones of the chain extenders and the molar fraction in the total amount of the chain extenders.

Preferably, the chain extender included in polyurethane raw material includes only a non-cyclic compound containing no ring structure. This is preferable because, in this case, the urethane groups in the hard segment of the polyurethane molecule are aggregated, so that a polyurethane having appropriate crystallinity can be easily obtained. A polishing layer using such a polyurethane is less likely to suffer from a reduction in the elastic modulus or the hardness due to absorbing water or the heat generated during polishing, and exhibits high planarization performance and high polishing stability. This is preferable because, as a result, a polishing layer that exhibits both good dressing performance and high planarization performance or high polishing stability can be easily obtained.

As the polymer diol used for production of the polyurethane, any polymer diol that has been used as a polyurethane raw material and that has a number-average molecular weight of 400 or more, such as polyether diol, polyester diol, and polycarbonate diol can be used without any particular limitation.

Specific examples of the polyether diol include poly (ethylene glycol), poly(propylene glycol), poly(tetramethylene glycol), poly(methyltetramethylene glycol), poly(oxypropylene glycol), and a glycerin-based polyalkylene ether glycol. These may be used alone or in a combination of two or more.

Specific examples of the polyester diol include a polyester diol obtained, for example, by a direct esterification reaction or a transesterification reaction of a dicarboxylic acid or an ester-forming derivative such an ester or an anhydride thereof, etc. and a low-molecular weight diol.

Specific examples of the dicarboxylic acid include aliphatic dicarboxylic acids, including, for example, C2-12 aliphatic dicarboxylic acids such as oxalic acid, succinic acid, glutaric acid, adipic acid, pimelic acid, suberic acid, azelaic acid, sebacic acid, dodecanedicarboxylic acid, 2-methylsuccinic acid, 2-methyladipic acid, 3-methyladipic acid, 3-methylpentanedioic acid, 2-methyloctanedioic acid, 3,8-dimethyldecanedioic acid and 3,7-dimethyldecanedioic acid; and also C14-48 dimerized aliphatic dicarboxylic acids (dimer acids) obtained by the dimerization of unsaturated fatty acids obtained by the fractional distillation of triglycerides, as well as the hydrogenated products from these C14-48 dimerized aliphatic dicarboxylic acids (hydrogenated dimer acids); alicyclic dicarboxylic acids such as 1,4-cyclohexanedicarboxylic acid; and aromatic dicarboxylic acids such as terephthalic acid, isophthalic acid and ortho-phthalic acid. Examples of the dimer acid and the hydrogenated dimer acid include "Pripol 1004", "Pripol 1006", "Pripol 1009", and "Pripol 1013" (trade names, manufactured by Unichema). These may be used alone or in a combination of two or more.

Specific examples of the low-molecular weight diol include aliphatic diols such as ethylene glycol, 1,3-propanediol, 1,2-propanediol, 2-methyl-1,3-propanediol, 1,4-butanediol, neopentyl glycol, 1,5-pentanediol, 3-methyl-1,5-pentanediol, 1,6-hexanediol, 1,7-heptanediol, 1,8-octanediol, 2-methyl-1,8-octanediol, 1,9-nonanediol and 1,10-decanediol; and alicyclic diols such as cyclohexanedimethanol and cyclohexanediol. These may be used alone, or in a combination of two or more. Among these, C6-12 diols are preferable, C8-10 diols are more preferable, and C9 diols are particularly preferable.

Specific examples of the polycarbonate diol include a polycarbonate diol obtained by reaction between a low-molecular weight diol and a carbonate compound. Examples of the low-molecular weight diol include the low-molecular weight diols as described above. Examples of the carbonate compound include dialkyl carbonates such as dimethyl carbonate and diethyl carbonate, alkylene carbonates such as ethylene carbonate, and diaryl carbonates such as diphenyl carbonate.

The polymer diols may be used alone or in a combination of two or more. Among these, it is particularly preferable to include at least one selected from the group consisting of poly(ethylene glycol), poly(propylene glycol), poly(tetramethylene glycol), or derivatives thereof, because they have good hydrophilicity.

The number-average molecular weight of the polymer diol is preferably 600 to 1400, more preferably 800 to 1200, and particularly preferably 800 to 1000. When the number-average molecular weight of the polymer diol is too low, the hardness and the tensile modulus of the resulting polyurethane tend to be reduced, thus reducing the polishing uniformity of the polishing layer. When the number-average molecular weight of the polymer diol is too high, the polishing layer tends to have a high hardness and a high elasticity, so that scratches are likely to occur. Note that the number average molecular weight of the polymer diol is a number average molecular weight calculated based on the hydroxyl value measured in accordance with JIS K 1557.

As the organic diisocyanate used for production of the thermoplastic polyurethane, any of the organic diisocyanates conventionally used as the materials of polyurethanes can be used without any particular limitation. Specific examples thereof include aliphatic or alicyclic diisocyanates such as ethylene diisocyanate, tetramethylene diisocyanate, pentamethylene diisocyanate, hexamethylene diisocyanate, 2,2,4-trimethylhexamethylene diisocyanate, 2,4,4-trimethylhexamethylene diisocyanate, dodecamethylene diisocyanate, isophorone diisocyanate, isopropylidene bis(4-cyclohexyl isocyanate), cyclohexylmethane diisocyanate, methylcyclohexane diisocyanate, 4,4'-dicyclohexylmethane diisocyanate, lysine diisocyanate, 2,6-diisocyanatomethyl caproate, bis(2-isocyanatoethyl) fumarate, bis(2-isocyanatoethyl) carbonate, 2-isocyanatoethyl-2,6-diisocyanatohexanoate, cyclohexylene diisocyanate, methylcyclohexylene diisocyanate and bis(2-isocyanatoethyl)-4-cyclohexylene; and aromatic diisocyanates such as 2,4'-diphenylmethane diisocyanate, 4,4'-diphenylmethane diisocyanate, 2,4-tolylene diisocyanate, 2,6-tolylene diisocyanate, m-phenylene diisocyanate, p-phenylene diisocyanate, m-xylylene diisocyanate, p-xylylene diisocyanate, 1,5-naphthylene diisocyanate, 4,4'-diisocyanatobiphenyl, 3,3'-dimethyl-4,4'-diisocyanatobiphenyl, 3,3'-dimethyl-4,4'-diisocyanatodiphenylmethane, chlorophenylene-2,4-diisocyanate, and tetramethylxylylene diisocyanate. These may be used alone, or in a combination of two or more. Among these, at least one selected from the group consisting of 4,4'-diphenylmethane diisocyanate, 2,4-tolylene diisocyanate, 2,6-tolylene diisocyanate and isophorone diisocyanate is preferable, and 4,4'-diphenylmethane diisocyanate is particularly preferable, because a polishing layer having reasonably good abrasion resistance can be provided.

The mixing ratio of the polymer diol, the chain extender, and the organic diisocyanate as the components contained in the polyurethane raw material used for production of the polyurethane may be selected as appropriate, taking into consideration the desired mechanical properties, abrasion resistance, and the like.

The mixing ratio of the organic diisocyanate to the polymer diol and the chain extender is preferably a ratio such that the amount of the isocyanate group contained in the organic diisocyanate is 0.95 to 1.3 moles, more preferably 0.96 to 1.10 moles, and particularly preferably 0.97 to 1.05 moles, per mole of the active hydrogen atom contained in the polymer diol and the chain extender, from the viewpoint of the well-balanced mechanical properties and the abrasion resistance of the polyurethane, and the productivity and the storage stability of the thermoplastic polyurethane.

As for the mass ratio of the polymer diol, the organic diisocyanate, and the chain extender, the ratio of (the amount of the polymer diol)/(the total amount of the organic diisocyanate and the chain extender) is preferably 15/85 to 45/55, more preferably 20/80 to 40/60, and particularly preferably 25/75 to 35/65.

The mixing ratio is preferably such that the content ratio of nitrogen derived from the organic diisocyanate in the polyurethane is preferably 4.0 to 6.0 mass %, more preferably, 4.3 to 5.8 mass %, and particularly preferably 4.5 to 5.5 mass %. This is preferable because, in this case, the interval between the urethane groups in the hard segment of the polyurethane molecule has a moderate length, so that a polyurethane having a moderate aggregation density of the polyurethane molecule and moderate crystallinity can be obtained. This is also preferable because a polishing layer exhibiting good dressing performance can be obtained. When the content ratio of nitrogen derived from the organic diisocyanate is too low, the temperature dependence of the hardness tends to be increased, and the polishing uniformity tends to be reduced. When the content ratio of nitrogen derived from the organic diisocyanate is too high, the interval between the urethane groups in the hard segment is increased, so that the aggregation density of the polyurethane molecules and the crystallinity of the polyurethane tend to be increased.

It is preferable that the thus obtained polyurethane has at least one, preferably 2 to 3 endothermic peaks at preferably 100 to 160° C., more preferably 110 to 150° C., and particularly preferably 120 to 160° C. in a DSC curve as measured using a differential scanning calorimeter (DSC), because a polishing layer that is well-balanced in the dressing performance and the temperature dependence of the mechanical properties can be obtained. It is particularly preferable that the polyurethane has at least two endothermic peaks in the range of 100 to 160° C. In such a case, the polishing layer is less likely to be softened by the heat generated during polishing, and therefore the below-described ratio ($E'_{21}/E'_{80}$) between a storage modulus $E'_{21}$ at 21° C. and a storage modulus $E'_{80}$ at 80° C. is likely to be 10 or less.

The total amount of the crystallization enthalpy ($\Delta H$) obtained from the endothermic peak area is preferably 10 J/g or more. This is particularly preferable because such an endothermic peak exhibiting moderate crystallinity at a relatively low temperature makes it possible to achieve both moderate temperature dependence and good dressing performance during polishing. Note that the upper limit of the total amount of the crystallization enthalpy ($\Delta H$) is not particularly limited, and is preferably about 35 J/g, because both appropriate temperature dependence and good dressing performance can be achieved.

When the polyurethane has two or more endothermic peaks, it is preferable that the endothermic peak at the lowest temperature is present at 100 to 160° C., and the total amount of the crystallization enthalpy ($\Delta H$) obtained from the endothermic peak area is 10 J/g or more. When the endothermic peak at the lowest temperature of the polyurethane is present at an excessively low temperature, the mechanical properties of the polishing layer tends to change during polishing due to an increased temperature dependence of the mechanical properties. When the endothermic peak at a lower temperature as measured by DSC is present at an excessively high temperature, the hardness and the abrasion resistance are also increased at a high temperature, so that the dressing performance may be insufficient.

The thus obtained polyurethane, in the form of a sheet having a thickness of 0.5 mm, has a laser transmittance for a laser wavelength of 660 nm, of preferably 70% or more, more preferably 80% or more, and particularly preferably 90% or more. Here, the laser transmittance for a laser wavelength of 660 nm refers to a value measured under the following conditions: laser wavelength (660 nm), laser output (310 µW), distance between a detection head and an output head (100 mm), and sample position (an intermediate point between the detection head and the output head). When the laser transmittance is too low, the soft segment and the hard segment of the polyurethane are likely to undergo phase separation, and tends to result in a thermoplastic polyurethane having a low impact resilience, thus reducing the polishing uniformity. When the laser transmittance is too low, the inspection of the material to be polished and the detection of the end point of polishing tend to be difficult to perform.

The thus obtained polyurethane, in the form of a sheet having a thickness of 0.3 mm, has a storage modulus retention when swollen to saturation with water of preferably 55% or more, more preferably 60% or more, and particularly preferably 75% or more, the storage modulus retention being calculated from the following formula (1): A/B×100 (1) (A represents the storage modulus at 21° C. after swollen to saturation with warm water at 50° C., and B represents the storage modulus at 21° C. when not swollen with water). When the storage modulus retention when swollen to saturation with water is too low, the mechanical properties of the polishing layer are likely to change as a result of the polishing layer absorbing water during polishing. Furthermore, the polishing rate tends to be reduced when the pad is left in a damp state for several hours to several days after completion of polishing.

When the thus obtained polyurethane, in the form of a sheet having a thickness of 0.3 mm, has a ratio ($E'_{21}/E'_{80}$) between a storage modulus $E'_{21}$ at 21° C. and a storage modulus $E'_{80}$ at 80° C., of 10 or less, the mechanical properties of the polishing layer are less likely to be changed by a temperature change during polishing, due to the reduced temperature dependence, so that a polishing layer exhibiting good polishing uniformity can be easily obtained. This is preferable because, in this case, a polishing layer that is particularly well-balanced in the dressing performance and the temperature dependence of the mechanical properties can be easily obtained.

When the thus obtained polyurethane, in the form of a sheet having a thickness of 2 mm, has a JIS-D hardness of preferably 50 to 70, and more preferably 50 to 65, the polishing layer has a moderate hardness and appropriately follows the surface to be polished, so that the polishing layer is less likely to cause a reduction in the local planarity and tends to prevent the occurrence of scratches.

The polyurethane according to the present embodiment has thermoplasticity. Note that the thermoplasticity means a property of being able to be molded by a molding method performed through heating and melting steps, such as extrusion molding, injection molding, calendaring, and 3D printing molding. A molded body for polishing layers can be obtained by molding a polyurethane by any of the various molding methods described above. It is particularly preferable to use extrusion molding using a T-die, because a sheet-like molded body having good productivity and a uniform thickness can be easily obtained.

The thickness of the polishing layer is not particularly limited, and can be adjusted as appropriate according to the layer configuration and the usage of the polishing pad. Specifically, the thickness of the polishing layer is, for example, preferably 0.8 to 3.0 mm, more preferably 1.0 to 2.5 mm, and particularly preferably 1.2 to 2.0 mm.

It is preferable that the polishing pad is a non-foamed molded body, because the polishing characteristics are less likely to vary, thus making it possible to achieve stable polishing. For example, in the case of a polishing layer using a foamed polyurethane produced by forming and curing by casting, the polishing characteristics such as the planarization performance and the planarization efficiency are likely to vary due to variations of the foamed structure, and increasing the hardness for enhancing the planarization performance tends to be difficult.

A polishing pad according to the present embodiment includes a polishing layer formed by cutting out a piece having a circular shape or the like from a sheet-like molded body. The polishing pad may be either a monolayer polishing pad formed of a polishing layer and a pressure-sensitive adhesive on the back surface thereof, or a multilayer polishing pad in which a cushioning layer is stacked on the polishing layer.

It is preferable that the cushioning layer used for the multilayer polishing pad is a layer having a hardness lower than the hardness of the polishing layer. When the hardness of the cushioning layer is lower than the hardness of the polishing layer, the hard polishing layer follows the local irregularities of the surface to be polished, and the cushioning layer follows the warpage and the undulations on the entire base material to be polished, so that it is possible to achieve polishing that is well-balanced in the global planarity and the local planarity.

Specific examples of materials that can be used as the cushioning layer include composites obtained by impregnating a non-woven fabric with a polyurethane; rubbers such as natural rubber, nitrile rubber, polybutadiene rubber and silicone rubber; thermoplastic elastomers such as polyester thermoplastic elastomers, polyamide thermoplastic elastomers and fluorine thermoplastic elastomers; foamed plastics; and polyurethanes. Among these, a polyurethane having a foamed structure is particularly preferable because flexibility desirable for the cushioning layer can be easily achieved.

The thickness of the cushioning layer is not particularly limited, and is preferably about 0.3 to 1.2 mm, and more preferably about 0.5 to 1.0 mm, for example. When the cushioning layer is too thin, the effect of following the warpage and the undulations on the entire base material to be polished tends to be reduced, resulting in a reduction in the global planarity. On the other hand, when the cushioning layer is too thick, the polishing pad as a whole becomes soft, making it difficult for polishing to be performed in a stable manner.

Preferably, recesses such as grooves and holes are formed in a predetermined concentric pattern on the polishing surface of the polishing layer by grinding or laser processing. Such recesses are useful for uniformly and sufficiently supplying a slurry to the polishing surface, as well as discharging polishing debris that could cause scratches, and preventing a damage to the wafer caused by adsorption by the polishing layer. For example, in the case of forming grooves concentrically, the pitch between the grooves is preferably about 1.0 to 50 mm, more preferably about 1.5 to 30 mm, particularly preferably about 2.0 to 15 mm, and quite particularly preferably about 6.0 to 15 mm. The width of the grooves is preferably about 0.1 to 3.0 mm, more preferably about 0.2 to 2.0 mm, and quite particularly preferably about 0.4 to 2.0 mm. The depth of the grooves is preferably about 0.2 to 1.8 mm, and more preferably about 0.4 to 1.5 mm. The cross-sectional shape of the grooves may be appropriately selected from, for example, a rectangular shape, a trapezoidal shape, a triangular shape, and a semicircular shape, according to the purpose.

The method for forming the recesses in the polishing layer is not particularly limited. Specific examples thereof include a method in which the surface of the polishing layer is subjected to cutting so as to form a predetermined pattern of recesses, a method in which recesses are formed by performing transferring using a mold during injection molding, and a method in which recesses are formed by stamping using a heated die.

Next, one embodiment of CMP using the polishing pad as described above will be described.

In CMP, a CMP apparatus 20 including a rotary platen 11 having a circular shape as viewed in a plan view, a slurry supply nozzle 12, a carrier 13, and a pad dresser 14 as shown in FIG. 1 is used, for example. A polishing pad 10 including the above-described polishing layer is attached to the surface of the rotary platen 11 using double-sided tape or the like. In addition, the carrier 13 supports a material 15 to be polished.

In the CMP apparatus 20, the rotary platen 11 is rotated by a motor (not shown) in the direction indicated by the arrow. The carrier 13 is rotated, in the plane of the rotary platen 11, by a motor (not shown), for example, in the direction indicated by the arrow. The pad dresser 14 is also rotated, in the plane of the rotary platen 11, by a motor (not shown), for example, in the direction indicated by the arrow.

First, while pouring distilled water onto the polishing surface of the polishing pad 10 that is fixed to the rotary platen 11 and is rotated, the CMP pad dresser 14 in which diamond particles are fixed onto the surface of a carrier by electrodeposition of nickel or the like is pressed against the polishing surface so as to dress the polishing surface of the polishing pad 10. Through dressing, the polishing surface is adjusted to have a surface roughness suitable for polishing the surface to be polished.

As the pad dresser, diamond dressers are commonly used that are obtained by fixing diamonds having very small and equal diameters to a metal base using a metallic material by electrodeposition, brazing, or the like. The diamond dressers include irregular-type diamond dressers such as CMP-MP-100C, for which very sharp diamonds are used, and blocky-type diamond dressers such as CMP-MP3-DMB101-100E, for which diamonds with an obtuse angle as compared with the irregular-type diamond dressers are used.

The polishing layer using the polyurethane of the present embodiment is not particularly limited, and the pad surface that has been subjected to a dressing treatment using a pad dresser, for example, preferably has an arithmetic mean roughness (Ra) of 1.8 µm or more and a maximum height (Rz) of 20 µm or more, and particularly preferably has an arithmetic mean roughness (Ra) of 3.1 µm or more and a maximum height (Rz) of 30 µm or more.

Next, a slurry 16 is supplied from the slurry supply nozzle 12 to the polishing surface of the rotating polishing pad 10. In performing CMP, a lubricating oil, a coolant, and the like may be optionally used in combination with the slurry.

Here, as the slurry, it is preferable to use a slurry for use in CMP that contains, for example, a liquid medium such as water or oil; abrasive grains such as silica, alumina, cerium oxide, zirconium oxide or silicon carbide; a base, an acid, a surfactant, an oxidizing agent such as a hydrogen peroxide solution, a reducing agent, and a chelating agent.

Then, the material 15 to be polished that is fixed to the carrier 13 and is rotating is pressed against the polishing pad 10 on which the slurry 16 is evenly spread across the polishing surface of the polishing layer. Then, the polishing treatment is continued until a predetermined planarity is achieved. Adjustment of the pressing force applied during polishing or the speed of relative movement between the rotary platen 11 and the carrier 13 affects the finishing quality.

The polishing conditions are not particularly limited; however, the rotational speed of each of the rotary platen and the carrier is preferably as low as 300 rpm or less in order to efficiently perform polishing, and the pressure applied to the material to be polished is preferably 150 kPa or less in order to prevent a flaw from being caused after polishing. During polishing, it is preferable that the slurry is continuously supplied to the polishing surface using a pump or the like. The amount of the slurry supplied is not particularly limited, and the polishing slurry is preferably supplied such that the polishing surface is constantly covered with the slurry.

Then, after the material to be polished that has undergone polishing is fully washed with running water, it is preferable to dry the material to be polished by removing water droplets attached thereto by using a spin drier or the like. In this manner, a smooth surface can be achieved on the entirety of the surface to be polished as a result of polishing the surface to be polished with the slurry.

Such CMP according to the present embodiment can be preferably used for polishing performed during the production process of various semiconductor devices, MEMS (MicroElectro Mechanical Systems), and the like. The CMP can be preferably used to polish objects to be polished, including, for example, an insulating film such as an oxide film formed on a semiconductor substrate, a wiring metal film of copper, aluminum, tungsten or the like; and a barrier metal film of tantalum, titanium, tantalum nitride, titanium nitride or the like, in particular, an insulating film such as an oxide film. The CPM can also be used to polish a metal film on which a pattern such as a wiring pattern or a dummy pattern is formed.

EXAMPLES

Hereinafter, the present invention will be described in further detail by way of examples. It should be appreciated that the scope of the invention is by no means limited to the examples.

Example 1

A polytetramethylene glycol (PTMG 850) having a number average molecular weight of 850, 1,9-nonanediol (1,9 ND), and 4,4'-diphenylmethane diisocyanate (MDI) were mixed at a ratio of PTMG 850:1,9 ND:MDI=32.9:22.4:44.7 (mass ratio), to prepare a prepolymer. Then, the obtained prepolymer was kneaded in a small-sized kneader for 5 minutes at 240° C. and a screw speed of 100 rpm, to obtain a thermoplastic polyurethane A. Then, the thermoplastic polyurethane A was evaluated according to the following evaluation methods.

<Dsc Measurement>

Using a differential scanning calorimeter ("Q2000" manufactured by TA instrument Japan Inc.), a crystallization enthalpy ($\Delta H$) (J/g) was determined from an endothermic peak temperature (C) of the thermoplastic polyurethane A and the endothermic peak thereof. Note that the measurement was performed with about 2 mg of a sample sealed in an aluminum pan, under a nitrogen gas atmosphere, and a temperature being raised from −30° C. to 250° C. at a rate of 10° C./min.

<Measurement of Nitrogen Content Derived from Organic Diisocyanate>

First, a total nitrogen content was calculated by elementary analysis under the following conditions:
  Apparatus: Fully automatic elemental analyzer 2400 series II (equipped with an autosampler as standard equipment) C H N S/O analyzer, manufactured by PerkinElmer, Inc.
  Electric furnace temperature: 975° C.
  Sample amount: 2 mg
  Combustion improver: None
  Sample container: Tin foil (with combustion improving effect, a single sheet was used)
  Standard substance for creating calibration curve: Sulfanilamide Next, the nitrogen atoms derived from the organic diisocyanate and the nitrogen atoms derived from the chain extender were detected by NMR measurement under the following conditions:
  Device: Nuclear magnetic resonance device Lambda 500 manufactured by JEOL, Ltd.
  Measurement conditions: Resonance frequency; 1H 500 MHz/Probe; TH5FG2
  Solvent: DMSO-d6, Concentration; 5 wt %/vol
  Measurement temperature: 80° C.
  Number of times of integrations: 64 s Then, from the results of the elementary analysis and the NMR measurement, the nitrogen content derived from the organic diisocyanate was calculated.

<Light Transmittance of Thermoplastic Polyurethane Sheet>

A press-molded sheet having a thickness of 500 μm was produced. Then, a piece having a predetermined size was cut out from the press-molded sheet, and the light transmittance for a wavelength of 660 nm of the obtained piece was measured under the following conditions:
  Spectral transmittance measurement device: "U-4000 Spectrometer" manufactured by Hitachi, Ltd.
  Laser wavelength: 660 nm
  Laser output: 310 μW
  Distance between detection head and output head: 10 cm
  Measurement position of test piece: Intermediate position between detection head and output head <Storage Modulus Retention when Swollen to Saturation with Water>

A press-molded sheet having a thickness of 300 μm was produced. Then, a test piece of 5.0×30 (mm) was cut out from the press-molded sheet, and was left for 3 days at 23° C. and 65% RH so as to adjust the state of the test piece. Then, the dynamic viscoelastic modulus at 21° C. of the test piece was measured at a frequency of 11 Hz by using a dynamic viscoelastic measurement device (DVE Rheospectra manufactured by Rheology Co., Ltd.), to determine a storage modulus.

Meanwhile, a similar test piece was swollen to saturation with water by being immersed in 50° C. warm water for 48 hours. Then, after water was wiped off from the surface of the test piece taken out from the warm water, the dynamic viscoelastic modulus at 21° C. of the test piece was measured at a frequency of 11 Hz, to determine the dynamic viscoelastic modulus at 21° C. after swollen to saturation with warm water at 50° C. at a frequency of 11 Hz, thereby obtaining a storage modulus.

Then, the storage modulus after swollen to saturation with water was represented as A and the storage modulus when not swollen to saturation with water was represented as B, and the storage modulus retention when swollen with water was calculated by the following expression (1):

$$A/B \times 100 \quad (1)$$

(A represents the storage modulus at 21° C. after swollen to saturation with warm water at 50° C., and B represents the storage modulus at 21° C. when not swollen to saturation).
<Ratio ($E'_{21}/E'_{80}$) Between Storage Modulus at 21° C. and Storage Modulus at 80° C.>

A press-molded sheet having a thickness of 300 μm was produced. Then, a test piece of 5.0×30 (mm) was cut out from the press-molded sheet, and was left for 3 days at 23° C. and 65% RH so as to adjust the state of the test piece. Then, the dynamic viscoelastic moduli at 21° C. and 80° C. of the test piece were measured at a frequency of 11 Hz by using a dynamic viscoelastic measurement device (DVE Rheospectra manufactured by Rheology Co., Ltd.), to determine storage moduli.
<Hardness>

A press-molded sheet having a thickness of 2 mm was produced, and the hardness (JIS-D hardness) thereof was measured in accordance with JIS K 7311.
<Dressing Test>

A press-molded sheet having a thickness of 2.0 mm was produced, and a test piece of 20 mm×50 mm was cut out from the press-molded sheet. Grooves having a width of 1.0 mm and a depth of 1.0 mm were formed in the obtained test piece. Then, a hole having the same shape as the outside shape of the test piece was formed in a polishing layer, and the test piece was fitted into the hole, to give a polishing pad. The polishing pad was attached to a CMP apparatus (6EG nHance manufactured by Strasbaugh Inc.). Then, using two types of diamond dressers (CMP-MP-100C and CMP-MP3-DMB101-100E, manufactured by Asahi Diamond Industrial Co., Ltd.), the surface of the polishing pad was ground for 8 hours at a dresser rotation rate of 101 rpm, a polishing pad rotation rate of 100 rpm, and a dresser load of 4 lbf, while pouring a slurry at a rate of 150 mL/min.

Figure 2:
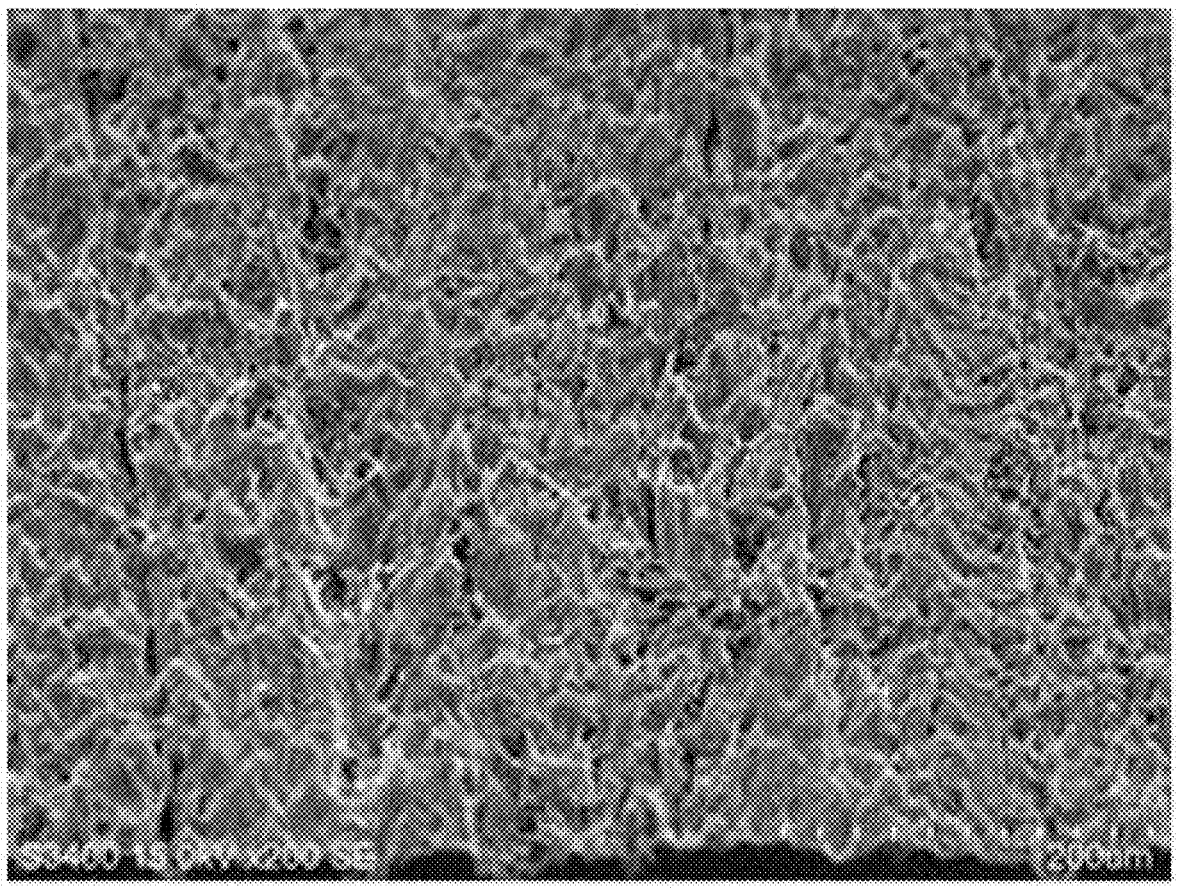
FIG. 2 is a scanning electron microscope (SEM) photograph of a surface of a polishing pad produced in Example 1, taken after an 8-hour accelerated dressing test by CMP-MP-100C using the polishing pad.
Figure 4:
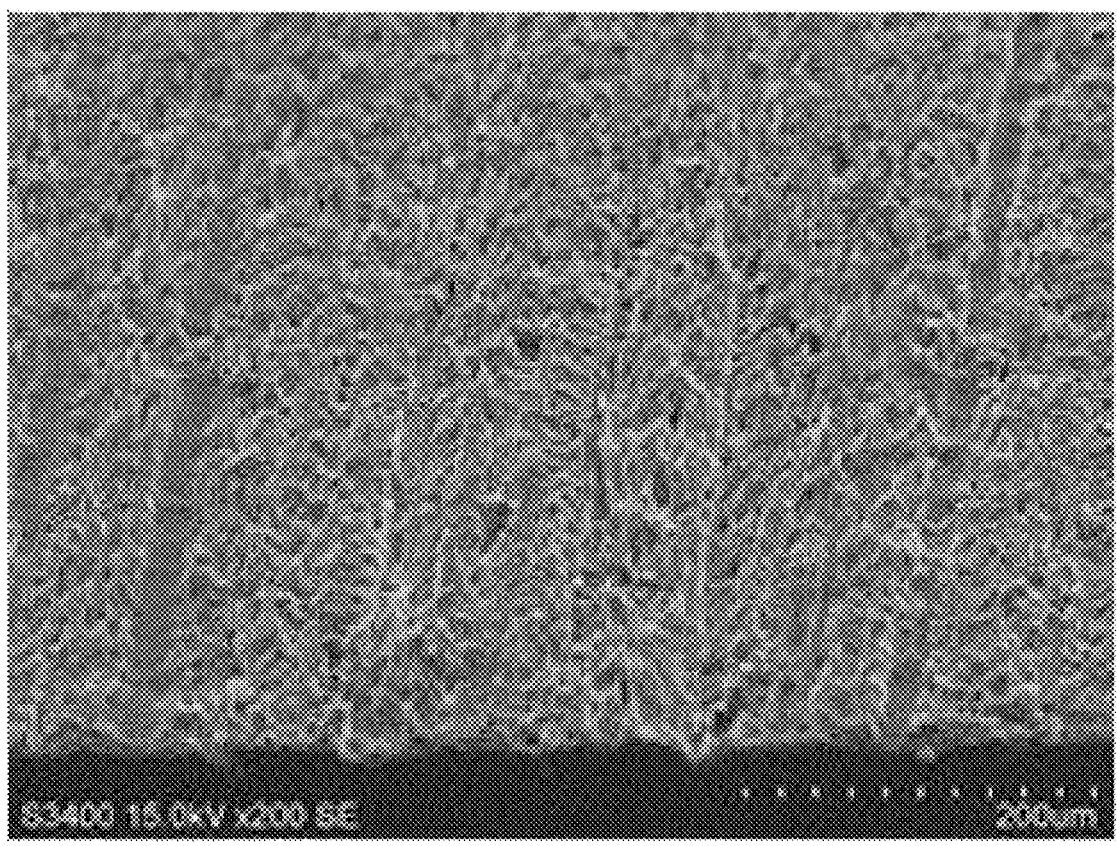
FIG. 4 is a scanning electron microscope (SEM) photograph of a surface of a polishing pad produced in Example 1, taken after an 8-hour accelerated dressing test by CMP-MP3-DMB101-100E using the polishing pad.

Then, the arithmetic mean roughness (Ra) and the maximum height (Rz) of the surface of the polishing layer after polishing were measured using a surface roughness meter (SJ-400 manufactured by Mitutoyo Corporation). As an example, FIG. 2 shows a SEM image of the surface of the polishing pad produced in Example 1, taken after performing the dressing test by CMP-MP-100C using the polishing pad. Also, FIG. 4 shows a SEM image of the surface of the polishing pad produced in Example 1, taken after performing the dressing test by CMP-MP3-DMB101-100E using the polishing pad.

The results of the above evaluation are shown in Table 1.

TABLE 1

| Example No. | | 1 | 2 | 3 | 4 | 5 | 6 | 7 | 8 | 9 | 10 |
|---|---|---|---|---|---|---|---|---|---|---|---|
| Polyurethane | | A | B | C | D | E | F | G | H | I | J |
| Polymer polyol | | PTMG 850 | PTMG 850 | PTMG 850 | PTMG 850 | PTMG 850 | PTMG 850 | PTMG 850 | PTMG 850 | PTMG 650 | PTMG 1400 |
| First chain extender (number) of carbon atoms) | | 1, 9 ND (9) | 1, 7 HD (7) | 1, 8 OD (8) | 1, 10 DD (10) | 1, 12 DD (12) | 1, 10 DD (10) | 1, 10 DD (10) | 1,10 DD (10) | 1, 9 ND (9) | 1, 9 ND (9) |
| Other chain extenders (number) of carbon atoms) | | — | — | — | — | — | 1, 4 BD (4) | 1, 4 BD (4) | 1, 6 HD (6) | — | — |
| First chain extender ratio (mass %) | | 100 | 100 | 100 | 100 | 100 | 50 | 80 | 60 | 100 | 100 |
| Organic diisocyanate | | MDI | MDI | MDI | MDI | MDI | MDI | MDI | MDI | MDI | MDI |
| Content ratio of isocyanate group-derived nitrogen atom (mass %) | | 5.0 | 5.3 | 5.1 | 4.9 | 4.6 | 5.4 | 5.1 | 5.1 | 5.1 | 4.8 |
| DSC peak temperature (° C.) | | 125/144/152 | 131/145 | 148/177 | 148/174 | 127/140 | 139 | 110 | 104 | 125/142/150 | 147/154/179 |
| Crystallization enthalpy ΔH (J/g) | | 4/8/5 (17) | 14/2 (16) | 20/3 (23) | 13/3 (16) | 25/5 (30) | 6 | 15 | 11 | 11/6/4 (21) | 7/6/4 (17) |
| Transmittance (%) | | 85 | 85 | 82 | 83 | 86 | 84 | 87 | 88 | 85 | 86 |
| Storage modulus A (MPa) | | 339 | 390 | 365 | 294 | 272 | 316 | 289 | 280 | 353 | 320 |
| Storage modulus B (MPa) | | 446 | 596 | 446 | 383 | 346 | 627 | 472 | 491 | 429 | 370 |
| Retention (A/B × 100 (%)) | | 76 | 65 | 82 | 77 | 79 | 50 | 61 | 57 | 82 | 86 |
| $E'_{21}/E'_{80}$ | | 4.3 | 8.7 | 6.6 | 4.4 | 4.9 | 16.8 | 15.3 | 33.6 | 8.9 | 3.7 |
| JIS-D hardness | | 59 | 62 | 60 | 56 | 55 | 62 | 60 | 55 | 61 | 57 |
| CMP-MP-100C (irregular type) | Ra (μm) | 3.6 | 3.3 | 3.6 | 3.5 | 3.3 | 3.5 | 3.3 | 3.1 | 3.3 | 3.6 |
| | Rz (μm) | 37 | 31 | 37 | 35 | 33 | 35 | 33 | 30 | 31 | 35 |
| CMP-MP3-DMB101-100E (blocky type) | Ra (μm) | 2.0 | 2.1 | 2.1 | 2.1 | 2.0 | 2.1 | 2.3 | 2.2 | 1.9 | 2.2 |
| | Rz (μm) | 20 | 22 | 22 | 21 | 21 | 20 | 22 | 23 | 20 | 22 |

Example 2

PTMG 850, 1,7-heptanediol (1,7 HD), and MDI were mixed at a ratio of PTMG 850:1,7 HD:MDI=33.0:19.8:47.2 (mass ratio), to prepare a prepolymer. Then, the obtained prepolymer was kneaded in a small-sized kneader for 5 minutes at 240° C. and a screw speed of 100 rpm, to obtain a thermoplastic polyurethane B. Then, the same evaluation as in Example 1 was performed except for using the thermoplastic polyurethane B in place of the thermoplastic polyurethane A. The results are shown in Table 1.

Example 3

PTMG 850, 1,8-octanediol (1,8 OD), and MDI were mixed at a ratio of PTMG 850:1,8 OD:MDI=33.0:21.1:45.9 (mass ratio), to prepare a prepolymer. Then, the obtained prepolymer was kneaded in a small-sized kneader for 5 minutes at 240° C. and a screw speed of 100 rpm, to obtain a thermoplastic polyurethane C. Then, the same evaluation as in Example 1 was performed except for using the thermoplastic polyurethane C in place of the thermoplastic polyurethane A. The results are shown in Table 1.

Example 4

PTMG 850, 1,10-decanediol (1,10 DD), and MDI were mixed at a ratio of PTMG 850:1,10 DD:MDI=33.1:23.5:43.4 (mass ratio), to prepare a prepolymer. Then, the obtained prepolymer was kneaded in a small-sized kneader for 5 minutes at 240° C. and a screw speed of 100 rpm, to obtain a thermoplastic polyurethane D. Then, the same evaluation as in Example 1 was performed except for using the thermoplastic polyurethane D in place of the thermoplastic polyurethane A. The results are shown in Table 1.

Example 5

PTMG 850, 1,12-dodecandiol (1,12 DD), and MDI were mixed at a ratio of PTMG 850:1,12 DD:MDI=33.0:25.6:41.4 (mass ratio), to prepare a prepolymer. Then, the obtained prepolymer was kneaded in a small-sized kneader for 5 minutes at 240° C. and a screw speed of 100 rpm, to obtain a thermoplastic polyurethane E. Then, the same evaluation as in Example 1 was performed except for using the thermoplastic polyurethane E in place of the thermoplastic polyurethane A. The results are shown in Table 1.

Example 6

PTMG 850, 1,4-butane diol (1,4 BD), 1,10-decanediol (1,10 DD), and MDI were mixed at a ratio of PTMG 850:1,4 BD: 1,10 DD:MDI=33.1:9.3:9.0:48.6 (mass ratio), to prepare a prepolymer. Then, the obtained prepolymer was kneaded in a small-sized kneader for 5 minutes at 240° C. and a screw speed of 100 rpm, to obtain a thermoplastic polyurethane F. Then, the same evaluation as in Example 1 was performed except for using the thermoplastic polyurethane F in place of the thermoplastic polyurethane A. The results are shown in Table 1.

Example 7

PTMG 850, 1,4 BD, 1,10 DD, and MDI were mixed at a ratio of PTMG 850:1,4 BD: 1,10 DD:MDI=33.1:4.3:16.8:45.8 (mass ratio), to prepare a prepolymer. Then, the obtained prepolymer was kneaded in a small-sized kneader for 5 minutes at 240° C. and a screw speed of 100 rpm, to obtain a thermoplastic polyurethane G. Then, the same evaluation as in Example 1 was performed except for using the thermoplastic polyurethane G in place of the thermoplastic polyurethane A. The results are shown in Table 1.

Example 8

PTMG 850, 1,6-hexanediol (1,6 HD), 1,10 DD, and MDI were mixed at a ratio of PTMG 850:1,6 HD: 1,10 DD:MDI=33.0:8.5:12.6:45.9 (mass ratio), to prepare a prepolymer. Then, the obtained prepolymer was kneaded in a small-sized kneader for 5 minutes at 240° C. and a screw speed of 100 rpm, to obtain a thermoplastic polyurethane H. Then, the same evaluation as in Example 1 was performed except for using the thermoplastic polyurethane H in place of the thermoplastic polyurethane A. The results are shown in Table 1.

Example 9

PTMG 650, 1,9 ND, and MDI were mixed at a ratio of PTMG 650:1,9 ND:MDI=32.9:21.3:45.8 (mass ratio), to prepare a prepolymer. Then, the obtained prepolymer was kneaded in a small-sized kneader for 5 minutes at 240° C. and a screw speed of 100 rpm, to obtain a thermoplastic polyurethane I. Then, the same evaluation as in Example 1 was performed except for using the thermoplastic polyurethane I in place of the thermoplastic polyurethane A. The results are shown in Table 1.

Example 10

PTMG 1400, 1,9 ND, and MDI were mixed at a ratio of PTMG 1400:1,9 ND:MDI=33.1:23.8:43.1 (mass ratio), to prepare a prepolymer. Then, the obtained prepolymer was kneaded in a small-sized kneader for 5 minutes at 240° C. and a screw speed of 100 rpm, to obtain a thermoplastic polyurethane J. Then, the same evaluation as in Example 1 was performed except for using the thermoplastic polyurethane J in place of the thermoplastic polyurethane A. The results are shown in Table 1.

Comparative Example 1

Figure 3:
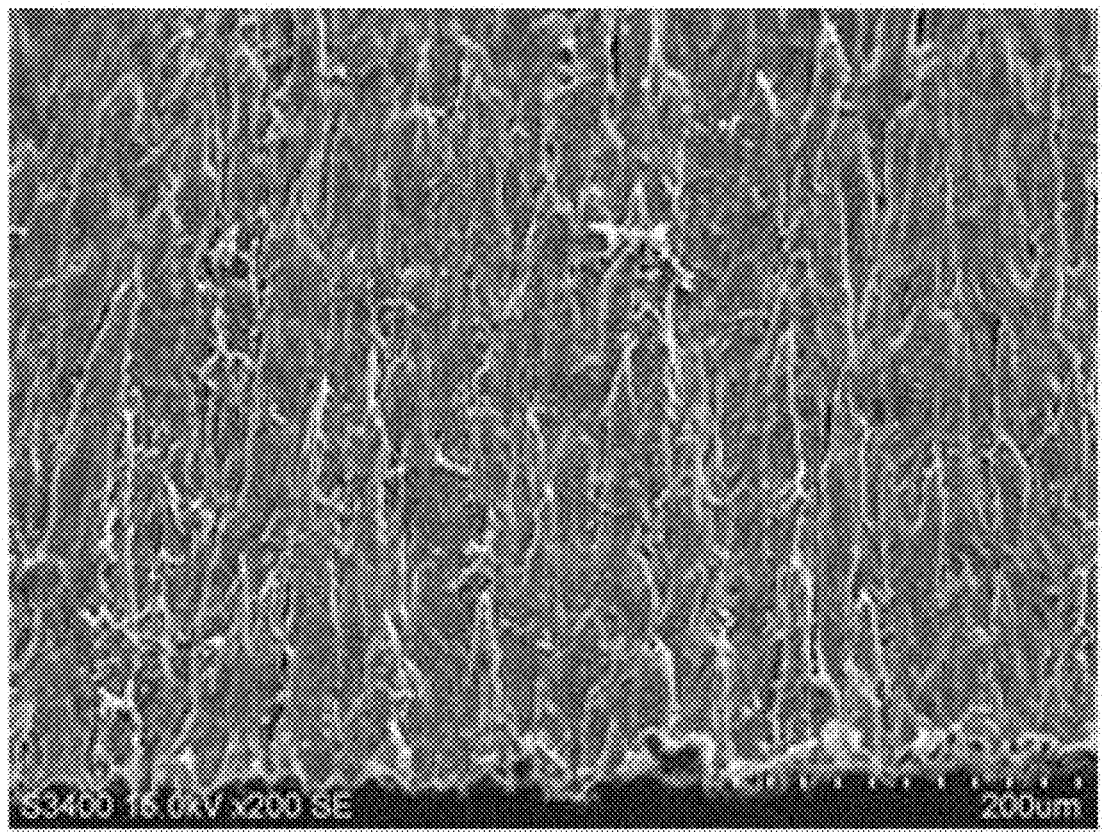
FIG. 3 is a scanning electron microscope (SEM) photograph of a surface of a polishing pad produced in Comparative Example 1, taken after an 8-hour accelerated dressing test by CMP-MP-100C using the polishing pad.
Figure 5:
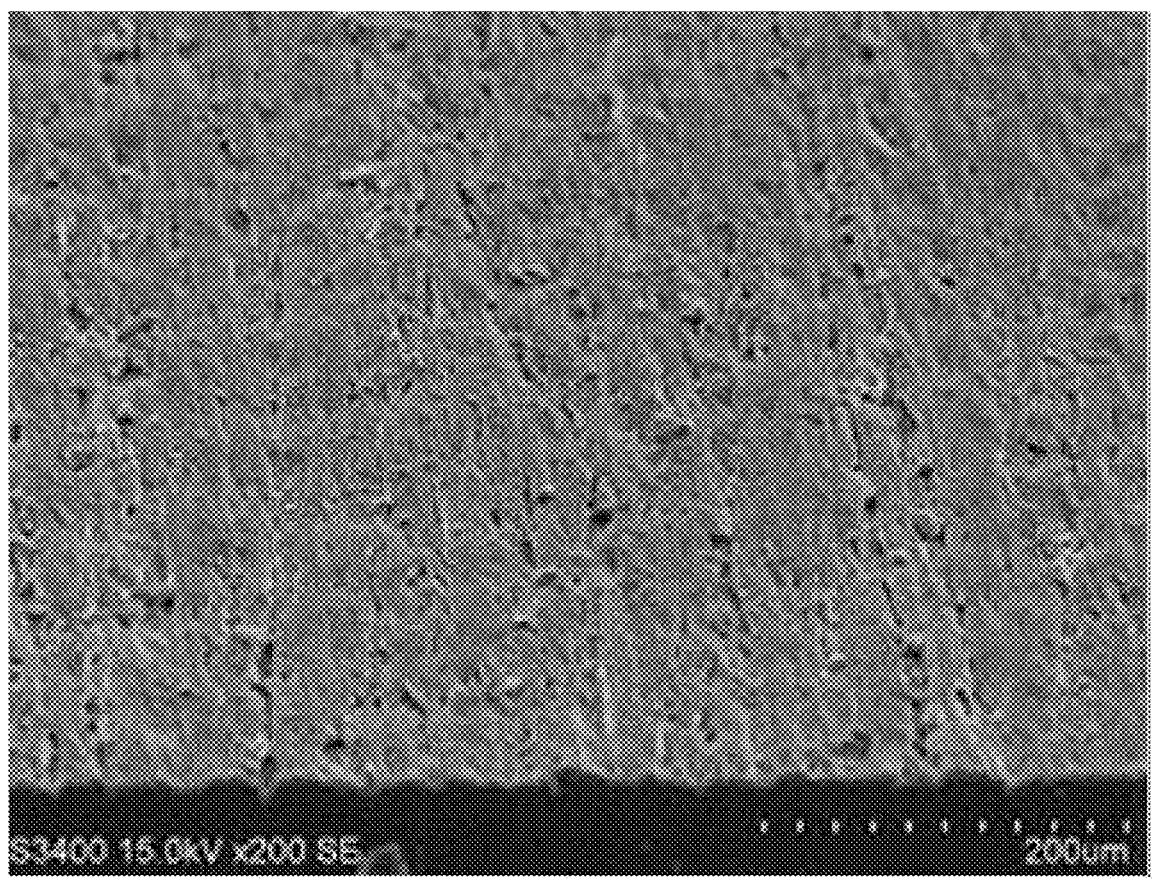
FIG. 5 is a scanning electron microscope (SEM) photograph of a surface of a polishing pad produced in Comparative Example 1, taken after an 8-hour accelerated dressing test by CMP-MP3-DMB101-100E using the polishing pad.

PTMG 850, 1,4 BD, and MDI were mixed at a ratio of PTMG 850:1,4 BD:MDI=33.0:15.2:51.8 (mass ratio), to prepare a prepolymer. Then, the obtained prepolymer was kneaded in a small-sized kneader for 5 minutes at 240° C. and a screw speed of 100 rpm, to obtain a thermoplastic polyurethane K. Then, the same evaluation as in Example 1 was performed except for using the thermoplastic polyurethane K in place of the thermoplastic polyurethane A. The results are shown in Table 2. FIG. 3 shows a SEM image of the surface of the polishing pad produced in Comparative Example 1, taken after performing the dressing test by CMP-MP-100C using the polishing pad. Additionally, FIG. 5 shows a SEM image of the surface of the polishing pad produced in Comparative Example 1, taken after performing the dressing test by CMP-MP3-DMB101-100E using the polishing pad.

TABLE 2

| Example No. | | Com Ex. 1 | Com Ex. 2 | Com Ex. 3 | Com Ex. 4 | Com Ex. 5 | Com Ex. 6 |
|---|---|---|---|---|---|---|---|
| Polyurethane | | K | L | M | N | O | P |
| Polymer polyol | | PTMG 850 | PTMG 850 | PTMG 850 | PTMG 850 | PTMG 850 | PTMG 850 |
| First chain extender (number) of carbon atoms) | | 1, 4 BD (4) | 1, 5 PD (5) | 1, 6 HD (6) | CHDM (6) | 1, 10 DD (10) | 1, 8 OD (8) |
| Other chain extenders (number) of carbon atoms) | | — | — | — | — | 1,4 BD (4) | 1,6 HD (6) |
| First chain extender ratio (mass %) | | 0 | 0 | 0 | 0 | 40 | 40 |
| Organic diisocyanate | | MDI | MDI | MDI | MDI | MDI | MDI |
| Content ratio of isocyanate group-derived nitrogen atom (mass %) | | 5.8 | 5.6 | 5.4 | 5.1 | 5.5 | 5.3 |
| DSC peak temperature (° C.) | | 187/206 | 154/166 | 143/183 | Amorphous | 167 | 187/208 |
| Crystallization enthalpy ΔH (J/g) | | 16/2 (18) | 10/7 (17) | 17/5 (22) | — | 12 | 11/2 (13) |
| Transmittance (%) | | 88 | 85 | 85 | 83 | 85 | 86 |
| Storage modulus A (MPa) | | 674 | 511 | 442 | 1420 | 300 | 311 |
| Storage modulus B (MPa) | | 908 | 680 | 602 | 1760 | 553 | 464 |
| Retention (A/B × 100 (%)) | | 74 | 75 | 73 | 81 | 54 | 67 |
| $E'_{21}/E'_{80}$ | | 6.1 | 6.1 | 6.5 | 267 | 9.2 | 10.3 |
| JIS-D hardness | | 67 | 67 | 65 | 77 | 63 | 61 |
| CMP-MP-100C (irregular type) | Ra (μm) | 2.9 | 2.9 | 3.0 | 3.5 | 2.8 | 3.0 |
| | Rz (μm) | 28 | 30 | 29 | 34 | 30 | 29 |
| CMP-MP3-DMB101-100E (blocky type) | Ra (μm) | 1.3 | 1.5 | 1.6 | 2.3 | 1.9 | 1.8 |
| | Rz (μm) | 11 | 16 | 17 | 23 | 18 | 19 |

Comparative Example 2

PTMG 850, 1,5-pentanediol (1,5 PD), and MDI were mixed at a ratio of PTMG 850:1,5 PD:MDI=33.0:16.8:50.1 (mass ratio), to prepare a prepolymer. Then, the obtained prepolymer was kneaded in a small-sized kneader for 5 minutes at 240° C. and a screw speed of 100 rpm, to obtain a thermoplastic polyurethane L. Then, the same evaluation as in Example 1 was performed except for using the thermoplastic polyurethane L in place of the thermoplastic polyurethane A. The results are shown in Table 2.

Comparative Example 3

PTMG 850, 1,6 HD, and MDI were mixed at a ratio of PTMG 850:1,6 HD:MDI=33.0:18.4:48.6 (mass ratio), to prepare a prepolymer. Then, the obtained prepolymer was kneaded in a small-sized kneader for 5 minutes at 240° C. and a screw speed of 100 rpm, to obtain a thermoplastic polyurethane M. Then, the same evaluation as in Example 1 was performed except for using the thermoplastic polyurethane M in place of the thermoplastic polyurethane A. The results are shown in Table 2.

Comparative Example 4

PTMG 850, cyclohexane dimethanol (CHDM), and MDI were mixed at a ratio of PTMG 850:CHDM:MDI=33.2:20.8:45.9 (mass ratio), to prepare a prepolymer. Then, the obtained prepolymer was kneaded in a small-sized kneader for 5 minutes at 240° C. and a screw speed of 100 rpm, to obtain a thermoplastic polyurethane N. Then, the same evaluation as in Example 1 was performed except for using the thermoplastic polyurethane N in place of the thermoplastic polyurethane A. The results are shown in Table 2.

Comparative Example 5

PTMG 850, 1,4 BD, 1,10 DD, and MDI were mixed at a ratio of PTMG 850:1,4 BD: 1,10 DD:MDI=33.0:10.5:7.2:49.3 (mass ratio), to prepare a prepolymer. Then, the obtained prepolymer was kneaded in a small-sized kneader for 5 minutes at 240° C. and a screw speed of 100 rpm, to obtain a thermoplastic polyurethane O. Then, the same evaluation as in Example 1 was performed except for using the thermoplastic polyurethane O in place of the thermoplastic polyurethane A. The results are shown in Table 2.

Comparative Example 6

PTMG 850, 1,6 HD, 1,8 OD, and MDI were mixed at a ratio of PTMG 850:1,6 HD: 1,10 DD:MDI=33.1:11.6:7.7:45.9 (mass ratio), to prepare a prepolymer. Then, the obtained prepolymer was kneaded in a small-sized kneader for 5 minutes at 240° C. and a screw speed of 100 rpm, to obtain a thermoplastic polyurethane H. Then, the same evaluation as in Example 1 was performed except for using the thermoplastic polyurethane H in place of the thermoplastic polyurethane A. The results are shown in Table 2.

The results shown in Tables 1 and 2 demonstrate the following. The polishing pads obtained in Examples 1 to 10, each of which includes, as the polishing layer, a molded body of a polyurethane including a thermoplastic polyurethane that is a reaction product of a polyurethane raw material including a polymer diol, an organic diisocyanate, and a chain extender, wherein the chain extender contains 50 mass % or more of a first chain extender including a straight-chain carbon backbone having 7 to 12 carbon atoms, exhibited good dressing performance despite having a low surface hardness, because the interval between the urethane groups in the hard segment was increased, so that the aggregation density between the molecular chains, the crystallinity, and the abrasion resistance were moderately reduced. On the other hand, the polishing pads obtained in Comparative Examples 1 to 3, 5 and 6, each of which includes, as the polishing layer, a thermoplastic polyurethane using an chain extender not containing 50 mass % or more of the first chain extender including a straight-chain carbon backbone having 7 to 12 carbon atoms, exhibited high abrasion resistance and a reduction in the dressing performance, because the aggregation density between the molecular chains and the crystallinity were increased due to a shorter interval between the urethane groups in the hard segment. In addition, the polishing pad obtained in Comparative Example 4, which includes, as the polishing layer, a thermoplastic polyurethane using a chain extender having 6 carbon atoms, which was a cyclic compound, was amorphous and had a high surface hardness.

The invention claimed is:

1. A polyurethane, consisting of:
a thermoplastic polyurethane that is a reaction product of a polyurethane raw material comprising a polymer diol, an organic diisocyanate, and a chain extender,
wherein the polymer diol has a number-average molecular weight of from 600 to 1200,
wherein the chain extender in the polyurethane raw material consists of
from 50 mass % to 100 mass % of a first chain extender which is a diol compound having a straight-chain carbon backbone with 7 to 12 carbon atoms, and
from 0 mass % to 50 mass % of a second chain extender which is a diol compound having a straight-chain carbon backbone having a number of carbon atoms which is selected from the group consisting of 3 carbon atoms, 4 carbon atoms, 5 carbon atoms, 6 carbon atoms, 16 carbon atoms, and 18 carbon atoms.

2. The polyurethane according to claim 1,
wherein the chain extender in the polyurethane raw material consists of 80 mass % or more of the first chain extender and 20 mass % or less of the second chain extender.

3. The polyurethane according to claim 1,
wherein the first chain extender consists of at least one compound selected from the group consisting of 1,7-heptanediol, 1,8-octanediol, 1,9-nonanediol, 2-methyl-1,8-octanediol, 1,10-decanediol, and 1,12-dodecandiol.

4. The polyurethane according to claim 1,
wherein the polyurethane has at least one endothermic peak in a range of from 100 to 160° C. in a DSC curve as measured by differential scanning calorimetry.

5. The polyurethane according to claim 1,
wherein the polyurethane has at least two endothermic peaks in a range of from 100 to 160° C. in a DSC curve as measured by differential scanning calorimetry.

6. The polyurethane according to claim 4,
wherein the at least one endothermic peak have a total amount of a crystallization enthalpy ($\Delta H$) of 10 J/g or more.

7. The polyurethane according to claim 1,
wherein the polyurethane comprises from 4.0 to 6.0 mass % of nitrogen derived from the organic diisocyanate.

8. The polyurethane according to claim 1,
wherein the polyurethane, in a form of a sheet having a thickness of 0.5 mm, has a laser transmittance for a laser wavelength of 660 nm, of 70% or more.

9. The polyurethane according to claim 1,
wherein the polyurethane, in a form of a sheet having a thickness of 0.3 mm, has a storage modulus retention when swollen to saturation with water, of 55% or more, as calculated by formula (1):

$$A/B \times 100 \qquad (1)$$

wherein A represents a storage modulus at 21° C. after swollen to saturation with warm water at 50° C., and B represents a storage modulus at 21° C. when not swollen with water.

10. A polishing layer, comprising a molded body of the polyurethane according to claim 1.

11. The polishing layer according to claim 10,
wherein the polishing layer comprises a non-foamed molded body.

12. A polishing pad, comprising the polishing layer according to claim 10.

13. A polishing pad, comprising the polishing layer according to claim 11.

14. The polyurethane according to claim 5,
wherein the endothermic peaks have a total amount of a crystallization enthalpy ($\Delta H$) of 10 J/g or more.

15. A polishing layer, comprising a molded body of the polyurethane according to claim 1,
wherein the molded body is a non-foamed molded body,
wherein the chain extender comprises 80 mass % or more of the first chain extender and
wherein the polyurethane has at least one endothermic peak in a range of from 100 to 160° C. in a DSC curve as measured by differential scanning calorimetry.

16. The polishing layer according to claim 15,
wherein the polyurethane has at least two endothermic peaks in a range of 100 to 160° C. in a DSC curve as measured by differential scanning calorimetry.

17. The polishing layer according to claim 16,
wherein the endothermic peaks have a total amount of a crystallization enthalpy ($\Delta H$) of 10 J/g or more.

18. The polyurethane according to claim 1,
wherein the second chain extender consists of at least one selected from the group consisting of 2,2-dimethylpropane-1,3-diol, 1,4-butane diol, 1,5-pentanediol, 3-methyl-1,5-pentanediol, 1,6-hexanediol, 1,16-hexadecane diol; and 1,18-octadecanediol.

19. A polyurethane, comprising:
a thermoplastic polyurethane that is a reaction product of a polyurethane raw material comprising a polymer diol, an organic diisocyanate, and a chain extender,
wherein the polymer diol has a number-average molecular weight of from 600 to 1200, wherein the chain extender in the polyurethane raw material consists of from 50 mass % to 100 mass % of a first chain extender and from 0 mass % to 50 mass % of a second chain extender, and wherein the first chain extender consists of at least one compound selected from the group consisting of 1,7-heptanediol, 1,8-octanediol, 2-methyl-1,8-octanediol, 1,10-decanediol, and 1,12-dodecandiol, and the second chain extender consists of at least one diol compound containing a straight-chain carbon backbone having a number of carbon atoms which is selected from the group consisting of 3 carbon atoms, 4 carbon atoms, 5 carbon atoms, 6 carbon atoms, 16 carbon atoms, and 18 carbon atoms.

* * * * *